June 27, 1933.  W. C. HEDGCOCK  1,916,140
TRUCK
Filed Aug. 27, 1931  3 Sheets-Sheet 1
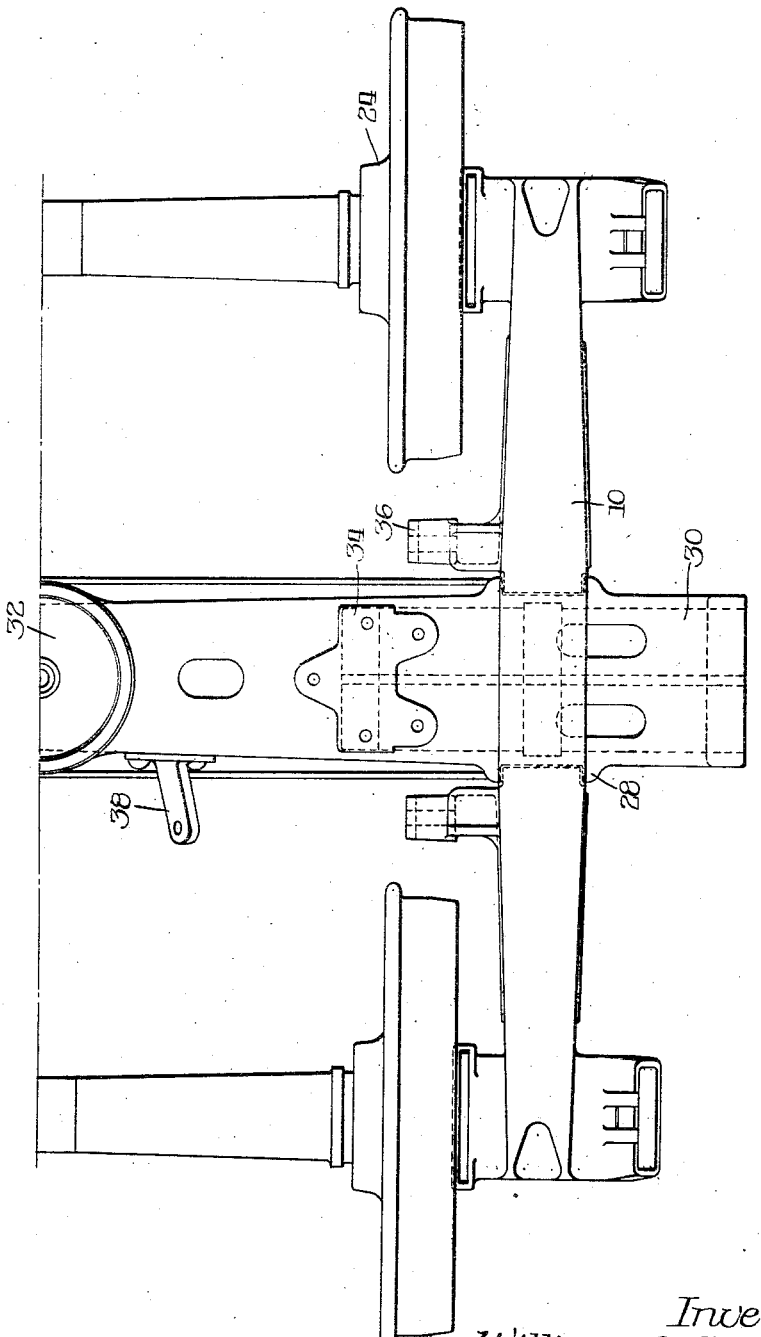
Inventor:
William C. Hedgcock.
By Wilkinson Huxley Byron & Knight
Attys June 27, 1933.  W. C. HEDGCOCK  1,916,140
TRUCK
Filed Aug. 27, 1931  3 Sheets-Sheet 2
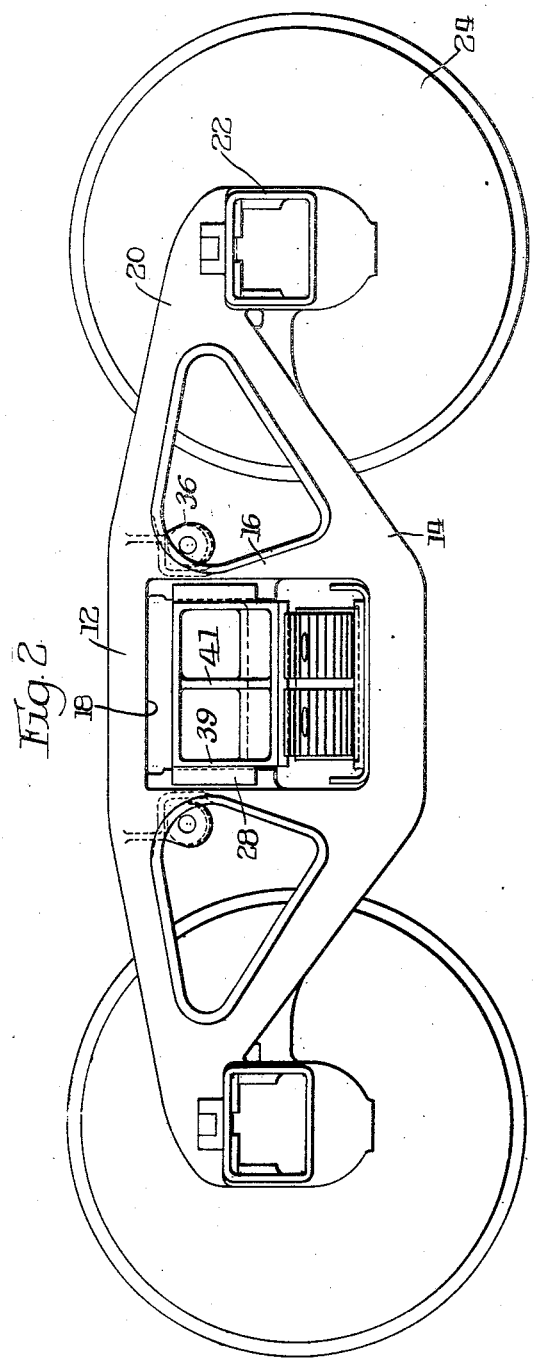
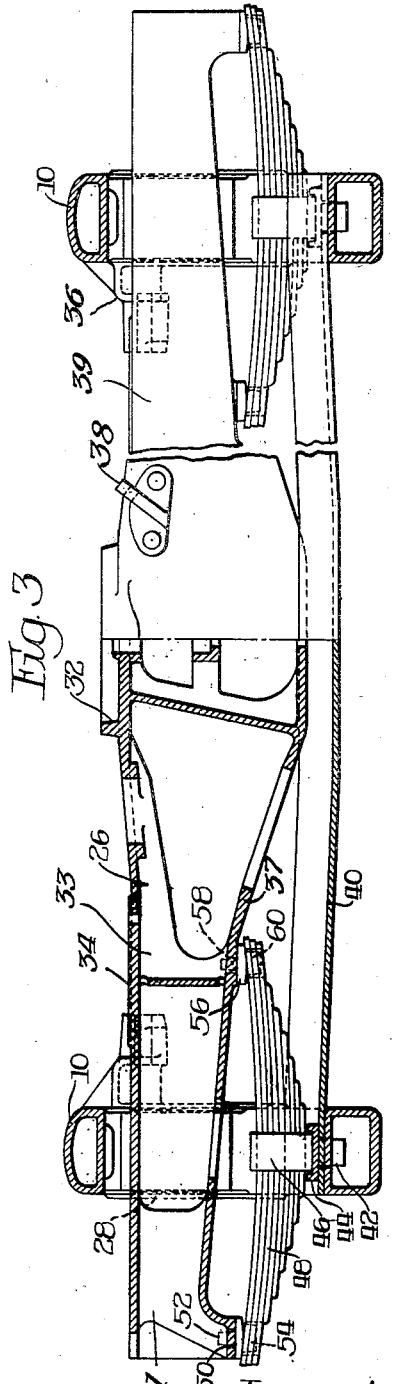
Inventor
William C. Hedgcock.
By Wilkinson Huxley Byron & Knight
Attys

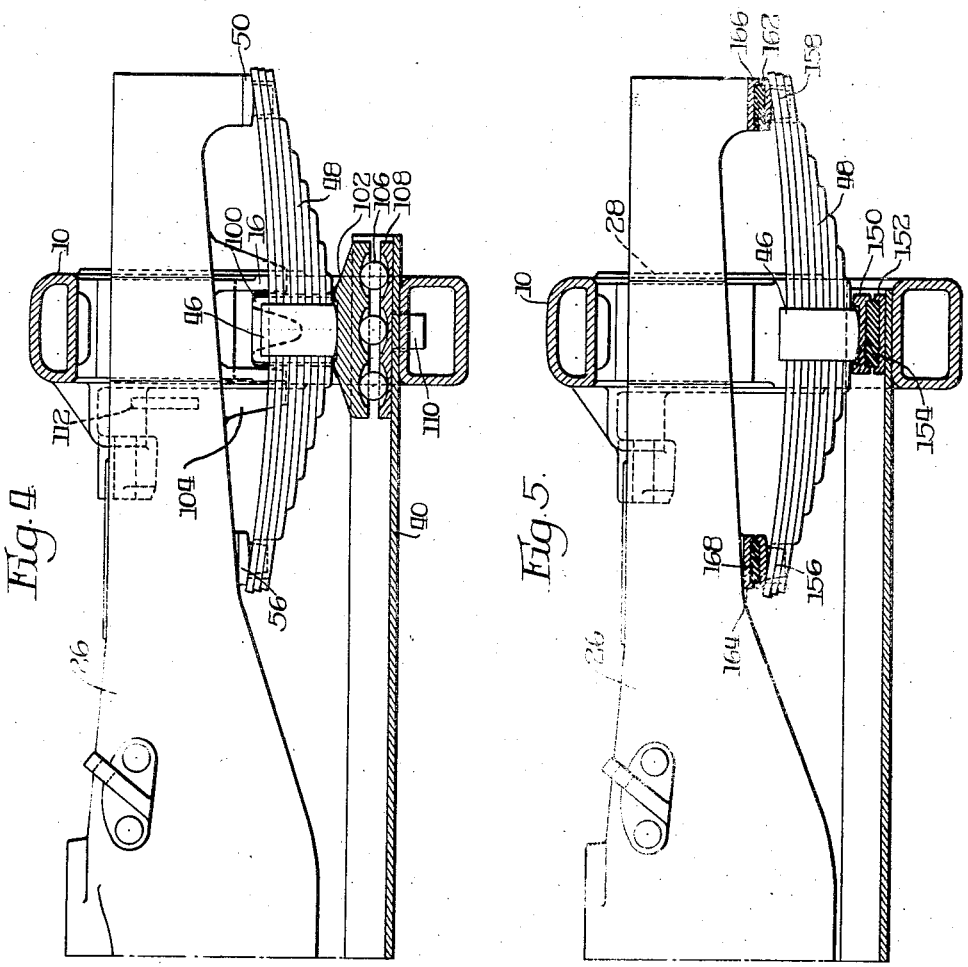

Patented June 27, 1933

1,916,140

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed August 27, 1931. Serial No. 559,619.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

It is possible and desirable to provide a freight car truck superior to the truck embodying only coil springs, and this may be accomplished by providing a truck wherein leaf springs are used alone. However, with the dimensions available for the usual freight car truck or similar truck, space is limited. It has been customary where leaf springs are used on freight car type trucks to use full elliptic springs mounted on the side frame within the bolster opening and supporting the bolster. The load to be carried by trucks from modern freight cars or locomotive tenders or similar equipment is quite heavy requiring a high capacity elliptic spring if used. To obtain this high capacity with a full elliptic spring requires a great deal of space, more space than is commonly available within the bolster openings of the usual freight car type of truck. This space is limited because the height from the rail to the top of the side frame is restricted by the clearance required for the car body frame. The distance from the rail to the underside of the side frame must be maintained with a certain minimum clearance prescribed by operating conditions, the dimensions of the structural members of the side frame and truck bolster being determined by the strength required in these parts, the whole developing conditions wherein the space for the springs is limited and wherein full elliptic springs of suitable capacity cannot generally be used.

It is, therefore, an object of this invention to provide a freight car truck wherein semi-elliptic springs are used, these semi-elliptic springs providing the same capacity as full elliptic springs but requiring substantially but half the vertical height required for full elliptic springs, consequently providing a structure which may be used within the usual space limitations.

Another object of the invention is to provide a car truck which provides good riding qualities and at the same time is economical to make and maintain, is simple and light in construction and fulfills all requirements of manufacture and service.

Still another object of the invention is to provide a truck construction wherein resilient pads are provided for dampening out metallic vibration transmitted through metallic truck parts, and also for the purpose of deadening noise.

With these and various other objects in view, the invention may consist of certain novel feaures of construction and operation as will be more fully described and particularly pointed out in the specification, drawings and claims appended hereto.

In the drawings, which illustrate embodiments of the device and wherein like reference characters are used to designate like parts—

Figure 1 is a top plan view of a truck construction embodying the invention;

Figure 2 is a side elevation of the truck construction shown in Figure 1;

Figure 3 is a transverse partial sectional elevation of the truck construction shown in Figures 1 and 2; and Figures 4 and 5 are transverse sectional elevations corresponding substantially to one-half of Figure 3, showing modified forms of truck constructions embodying the invention.

Referring first of all more particularly to the construction shown in Figures 1 to 3, inclusive, the side frames 10 are of the truss construction including the compression member 12, the tension member 14, and the spaced guide columns 16 forming the bolster opening 18. The tension and compression members merge adjacent their ends, as at 20, and are provided with journal boxes 22 which may be integral with the side frames. The journal boxes cooperate with the journal ends of the wheel and axle assemblies 24, and the wheel and axle assemblies and the journal boxes may be of any construction, being either of the friction type or embodying anti-friction bearings.

The load carrying member which in the present case is the bolster 26, extends through the bolster openings 18, being provided with guides 28 slidingly embracing the columns 16, the bolster end 30 extending outwardly of the side frames. The bolster is provided with the usual center bearing 32 and side bearings 34, and brake connections 36 and 38 may be provided on the side frame and bolster adjacent the wheels of the wheel and axle assemblies 24. The bolster is of substantial box section, the center bearing 32 and the side bearings 34 being provided on the bolster compression member 35, the bolster compression member 35 and tension member 37 are connected by the spaced connecting side walls 39 forming the box section, the tension and compression members are connected by the intermediate braces 33 disposed in substantial alignment with the side bearings 34 and spaced from the side walls 39, the end brace 41 is also provided connecting the bolster tension and compression members emerging into the outer spring seat provided on said bolster tension member, said brace member being likewise spaced from said connecting members 39. The spring plank 40 is disposed between the spaced side frames 10, being suitably secured thereto, the side frames and spring plank being apertured for the reception of the dowel 42 of the spring seat 44, the spring seat having supporting relation to the spring band 46 of the semi-elliptic spring assembly 48, the transverse axis of said spring assemblies being disposed substantially on the longitudinal center line of the truck side frame.

The outer end 30 of the bolster is provided with the depending arcuate spring seat 50 having a dowel 52 for positioning said spring seat, in the embodiment shown, to the bolster and being provided with a depending dowel 54 adapted to be received in a suitable elongated aperture in the spring assembly. A similar spring seat 56 is disposed on the bolster tension member inwardly of the side frames and in substantial horizontal alignment with said seat 50, said seat 56 being secured to the bolster as by means of the dowel 58, and being provided with the depending dowel 60 received in the elongated aperture in the inner end of the semi-elliptic springs.

The semi-elliptic springs are thus supported by the side frames, each at a single point, and each providing a plurality of spaced supports for the bolster. The friction between the leaves of the semi-elliptic springs absorbs a certain amount of energy during spring motion and thereby partially dampens oscillation.

Referring now to the modification illustrated in Figure 4, the bolster 26 extends through the bolster opening provided in the side frame 10 and is provided with the semi-elliptic leaf spring assembly 48, in a manner similar to the modification just described. The leaf spring assembly is positioned by means of the spring seats 50 and 56 and the spring assembly is provided with the spring band 46 seated on the roller cap 102, which is provided with the upwardly extending guides 100, the bolster being provided with depending pedestals 104, which may be omitted, permitting vertical movements between the roller cap 102 and the bolster but limiting lateral movement of the roller cap 102 with respect to the side frame. Anti-friction rollers 106 are provided between the roller cap 102 and the roller seat 108, the roller seat being provided with the dowel 110 for positioning the seat on the tension member of the side frame extending through a suitable aperture provided therein, and through an aligned aperture provided in the spring plank 40. With this construction, lateral movement of the bolster is permitted, suitable stops 112 being provided on the bolster for cooperating with the columns 16 for limiting lateral movements of the bolster.

Referring now more particularly to the form of construction shown in Figure 5, this construction is similar to that already described in Figures 1 to 3, inclusive, like reference characters being used to designate like parts. In this construction, the spring band 46 of the leaf spring assembly 48 is seated upon a seat member 150, said seat member having depending flanges opposing similar flanges on the bottom seat member 152, a rubber or other resilient pad 154 being disposed between the members 150 and 152. The inner and outer ends of the leaf spring assembly are apertured for the reception of depending dowels 156 and 158 provided on the spring seat members 160 and 162, said members being provided with upwardly extending flanges opposing similar flanges on the seat members 164 and 166 provided on the bolster 26, inwardly and outwardly of the side frame 10, and rubber or other resilient blocks or pads 168 are provided between the members 160 and 164, and 162 and 166.

It is to be understood that any spring arrangement or construction such as shown in application Serial No. 552,153, filed July 21, 1931, may be used, and that I do not wish to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In a car truck, the combination of a side frame, a load carrying member extending outwardly of said side frame and provided with a depending spring seat, said load carrying member having a spring seat inwardly of said side frame disposed in substantial horizontal alignment with said first-named spring seat, a spring seat mounted on said side frame and a semi-elliptic leaf spring mounted on said last-named spring seat between the ends of said spring, the legs of said leaf spring supportingly engaging said first named spring seats.

2. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having spaced spring seats disposed inwardly and outwardly of said side frame, said inner seat being disposed in substantial vertical alignment with one of said side bearings, and a semi-elliptic leaf spring supported on said side frame in said window, the legs of said leaf spring supportingly engaging said first named spring seats.

3. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having an outer depending spring seat, and an inner spring seat disposed inwardly of said side frame and disposed in substantially horizontal alignment with said first named spring seat, a spring seat mounted on said side frame in said window, and a semi-elliptic leaf spring mounted on said last named spring seat between the ends of said spring, the legs of said leaf spring supportingly engaging said first named spring seats.

4. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, a brace member disposed between and connecting said bolster tension and compression members below said side bearings, said brace member being spaced from the side members connecting said bolster tension and compression members, the bolster tension member having spaced spring seats disposed inwardly and outwardly of said side frame, said inner seat being disposed in substantial vertical alignment with said brace member, and a semi-elliptic leaf spring supported on said side frame in said window, the legs of said leaf spring supportingly engaging said first-named spring seats.

5. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, a brace member disposed between and connecting said bolster tension and compression members adjacent the ends of said bolster, said brace member being spaced from the side members connecting said bolster tension and compression members, the bolster tension member having spaced spring seats disposed inwardly and outwardly of said side frame, said outer seat being disposed in substantially vertical alignment with said brace member, and a semi-elliptic leaf spring supported on said side frame in said window, the legs of said leaf spring supportingly engaging said first named spring seats.

6. In a car truck, the combination of a side frame including tension and compression members and integrally connecting columns forming a window therewith, a bolster extending through said window and having portions having sliding cooperation with said columns, said bolster including tension and compression members and spaced connecting side members forming substantially a box section bolster, center and side bearings provided on said bolster compression member, a brace member disposed between and connecting said bolster tension and compression members below said side bearings, a brace member disposed adjacent the ends of said bolster and connecting said bolster tension and compression members and spaced from said first named brace member, said brace members being spaced from the side members connecting said bolster tension and compression members, the bolster tension member having spaced spring seats disposed inwardly and outwardly of said side frame, said seats respectively being disposed in substantial vertical alignment with the respective brace members, and a semi-elliptic leaf spring supported on said side frame in said window, the legs of said leaf spring supportingly engaging said first named spring seats.

7. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having an outer depending spring seat, and an inner spring seat disposed inwardly of said side frame and disposed in substantially horizontal alignment with said first named spring seat, and substantially in vertical alignment with one of said side bearings, a spring seat mounted on said side frame in said window, and a semi-elliptic leaf spring mounted on said last named spring seat between the ends of said spring, the legs of said leaf spring supportingly engaging said first named spring seats.

8. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, a brace member disposed between and connecting said bolster tension and compression members below said side bearings, said brace member being spaced from the side members connecting said bolster tension and compression members, the bolster tension member having spaced spring seats disposed inwardly and outwardly of said side frame, said inner seat being disposed in substantial vertical alignment with said brace member, the outer seat being a depending seat disposed substantially in horizontal alignment with said inner seat, and a semi-elliptic leaf spring supported on said side frame in said window, the legs of said leaf spring supportingly engaging said first-named spring seats.

9. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having an outer depending spring seat and an inner spring seat disposed inwardly of said side frame and disposed in substantially horizontal alignment with said first named spring seat, a brace member disposed between and connecting said bolster tension and compression members adjacent said depending spring seat, said brace member being spaced from the side members connecting said bolster tension and compression members, a spring seat mounted on said side frame in said window, and a semi-elliptic leaf spring mounted on said last named spring seat between the ends of said spring, the legs of said leaf spring supportingly engaging said first named spring seats.

10. In a car truck, the combination of a side frame including tension and compression members and integrally connecting columns forming a window therewith, a bolster extending through said window and having portions having sliding cooperation with said columns, said bolster including tension and compression members and spaced connecting side members forming substantially a box section bolster, center and side bearings provided on said bolster compression member, a brace member disposed between and connecting said bolster tension and compression members below said side bearings, a brace member disposed adjacent the ends of said bolster and connecting said bolster tension and compression members and spaced from said first named brace member, said brace members being spaced from the side members connecting said bolster tension and compression members, the bolster tension member having spaced spring seats disposed inwardly and outwardly of said side frame, said seats respectively being disposed in substantially vertical alignment with the respective brace members, said outer seat depending from said bolster and disposed in substantial horizontal alignment with said inner seat, and a semi-elliptic leaf spring supported on said side frame in said window, the legs of said leaf spring supportingly engaging said first named spring seats.

11. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having an outer depending spring seat and an inner spring seat disposed inwardly of said side frame and disposed in substantially horizontal alignment with said first named spring seat and in substantial vertical alignment with a side bearing, a brace member connecting said bolster tension and compression members and spaced from said bolster connecting side members, said brace member being adjacent the end of said bolster and substantially in alignment with said outer spring seat, a spring seat mounted on said side frame, and a semi-elliptic leaf spring mounted on said last named spring seat between the ends of said spring, the legs of said leaf spring supportingly engaging said first named spring seats.

12. In a car truck, the combination of a side frame including tension and compression members and integrally connecting columns forming a window therewith, a bolster extending through said window and having portions having sliding cooperation with said columns, said bolster including tension and compression members and spaced connecting side members forming a substantially box section bolster, center and side bearings provided on said bolster compression member, the bolster tension member having spaced spring seats disposed inwardly and outwardly of said side frame, said inner seat being disposed in substantial vertical alignment with one of said side bearings, a brace member connecting said bolster tension and compression members adjacent an end thereof and spaced from said connecting side members, said brace member being in substantial alignment with the outer spring seat, and a semi-elliptic spring supported on said side frame intermediate the ends of said spring, the legs of said spring supportingly engaging said seats.

13. In a car truck, the combination of a side frame, a load carrying member extending outwardly of said side frame and provided with a depending spring seat, said load carrying member having a spring seat inwardly of said side frame disposed in substantial horizontal alignment with said first named spring seat, lateral motion means mounted on said side frame and provided with a spring seat and a semi-elliptic leaf spring mounted on said last named spring seat between the ends of said spring, the legs of said leaf spring supportingly engaging said first named spring seats.

14. In a car truck, the combination of a side frame including tension and compression members and integrally connecting columns forming a window therewith, a bolster extending through said window and having portions having sliding cooperation with said columns, said bolster including tension and compression members and spaced connecting side members forming substantially a box section bolster, center and side bearings provided on said bolster compression member, a brace member disposed between and connecting said bolster tension and compression members below said side bearings, a brace member disposed adjacent the ends of said bolster and connecting said bolster tension and compression members and spaced from said first named brace members, said brace members being spaced from said connecting side members, the bolster tension member having spaced spring seats disposed inwardly and outwardly of said side frame, said seats respectively being disposed in substantial vertical alignment with the respective brace members, said outer seat depending from said bolster and disposed in substantial horizontal alignment with said inner seat, lateral motion means mounted on said side frame in said window and provided with a spring seat, and a semi-elliptic leaf spring supported on said last named seat between the ends of said spring, the legs of said leaf spring supportingly engaging said first named spring seats.

15. In a car truck, the combination of a side frame including tension and compression members and integrally connecting columns forming a window therewith, a bolster extending through said window and having portions having sliding cooperation with said columns, said bolster including tension and compression members forming substantially a box section bolster, center and side bearings provided on said bolster compression member, the bolster tension member having an outer depending spring seat and an inner spring seat disposed inwardly of said side frame and disposed substantially in horizontal alignment with said first named spring seat and substantially in vertical alignment with one of said side bearings, lateral motion means mounted on said side frame in said window and provided with a spring seat, and a semi-elliptic leaf spring mounted on said last named spring seat between the ends of said spring, the legs of said leaf spring supportingly engaging said first named spring seats.

16. In a car truck, the combination of a side frame, a load carrying member extending outwardly of said side frame and provided with a depending spring seat, said load carrying member having a spring seat inwardly of said side frame disposed in substantial horizontal alignment with said first named spring seat, lateral motion means mounted on said side frame and provided with a spring seat and a semi-elliptic leaf spring mounted on said last named spring seat between the ends of said spring, the legs of said leaf spring supportingly engaging said first named spring seats and resilient pads provided at certain of said seats.

17. In a car truck, the combination of a side frame including tension and compression members and integrally connecting columns forming a window therewith, a bolster extending through said window and having portions having sliding cooperation with said columns, said bolster including tension and compression members and spaced connecting side members forming substantially a box section bolster, center and side bearings provided on said bolster compression member, a brace member disposed between and connecting said bolster tension and compression members below said side bearings, a brace member disposed adjacent the ends of said bolster and connecting said bolster tension and compression members and spaced from said first named brace members, said brace members being spaced from said connecting side members, the bolster tension member having spaced spring seats disposed inwardly and outwardly of said side frame, said seats respectively being disposed in substantial vertical alignment with the respective brace members, said outer seat depending from said bolster and disposed in substantial horizontal alignment with said inner seat, lateral motion means mounted on said side frame in said window and provided with a spring seat, and a semi-elliptic leaf spring supported on said last named seat between the ends of said spring, the legs of said leaf spring supportingly engaging said first named spring seats and resilient pads provided at certain of said seats.

18. In a car truck, the combination of a side frame including tension and compression members and integrally connecting columns forming a window therewith, a bolster extending through said window and having portions having sliding cooperation with said columns, said bolster including tension and compression members forming substantially a box section bolster, center and side bearings provided on said bolster compression member, the bolster tension member having an outer depending spring seat and an inner spring seat disposed inwardly of said side frame and disposed substantially in horizontal alignment with said first named spring seat and substantially in vertical alignment with one of said side bearings, lateral motion means mounted on said side frame in said window and provided with a spring seat, and a semi-elliptic leaf spring mounted on said last named spring seat between the ends of said spring, the legs of said leaf spring supportingly engaging said first named spring seats and resilient pads provided at certain of said seats.

19. In a car truck, the combination of a side frame, a bolster extending outwardly of said side frame said bolster including tension and compression members and spaced connecting side members forming substantially a box section bolster, center and side bearings provided on said bolster compression member, the bolster tension member having spaced spring seats disposed inwardly and outwardly of said side frame, said inner seat being disposed in substantial vertical alignment with one of said side bearings and a semi-elliptic leaf spring supported on said side frame, the legs of said leaf spring supportingly engaging said first named spring seats.

20. In a car truck, the combination of a side frame, a bolster extending outwardly of said side frame, said bolster including tension and compression members and spaced connecting side members forming substantially a box section bolster, center and side bearings provided on said bolster compression member, a brace member disposed between and connecting said bolster tension and compression members below said side bearings, said brace member being spaced from said connecting side members, the bolster tension member having spaced spring seats disposed inwardly and outwardly of said side frame, said inner seat being disposed substantially in vertical alignment with said brace member and a semi-elliptic leaf spring supported on said side frame, the legs of said leaf spring supportingly engaging said first named spring seats.

Signed at Chicago, Illinois, this 18th day of August, 1931.

WILLIAM C. HEDGCOCK.